Sept. 22, 1931.  A. A. OEFFNER ET AL  1,824,493
BRICK MOLDING MACHINE
Filed April 8, 1929   5 Sheets-Sheet 5
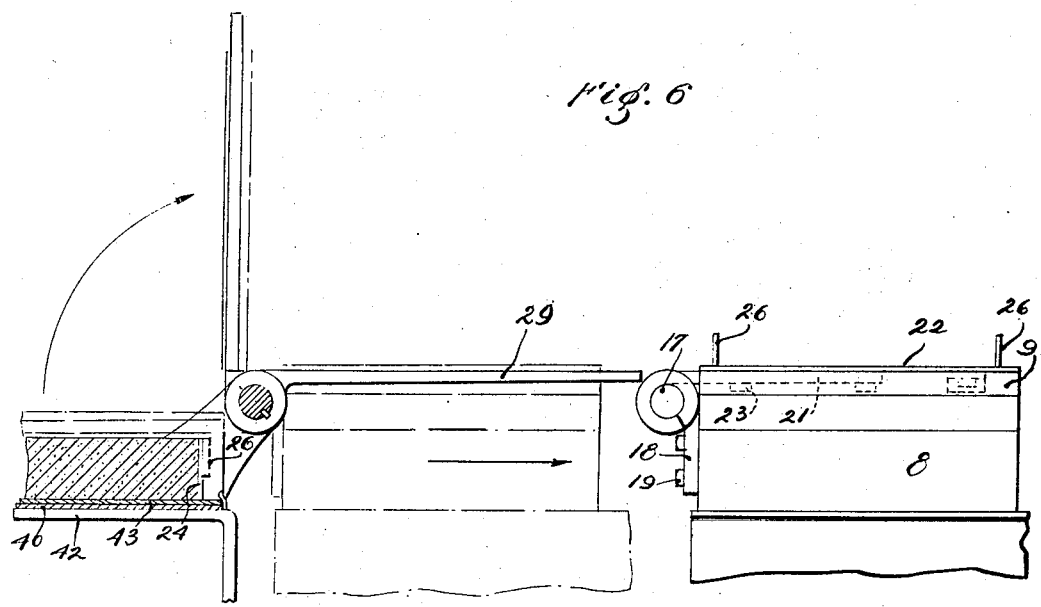
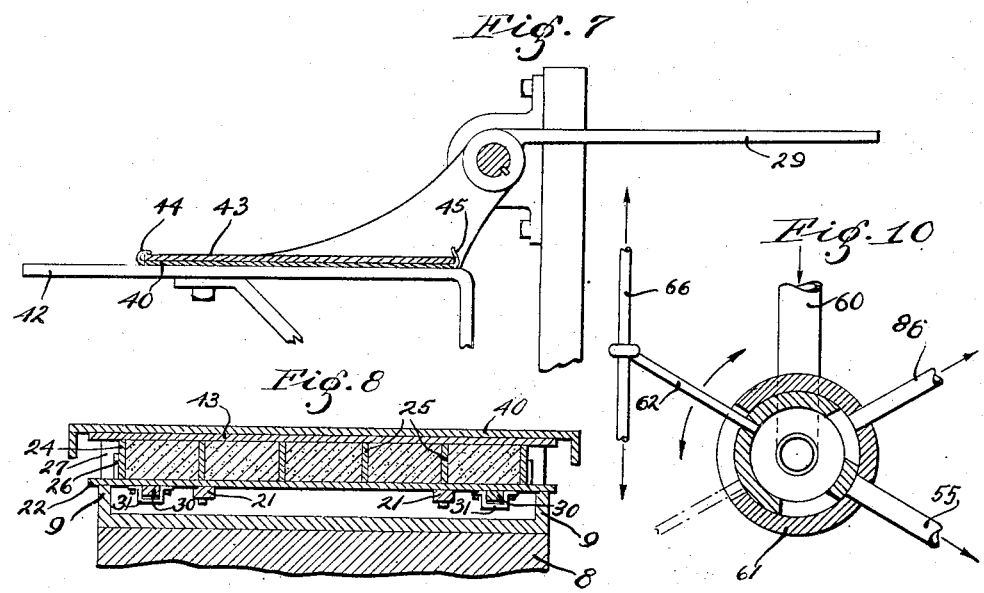
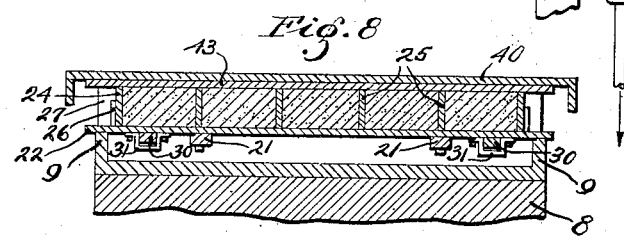
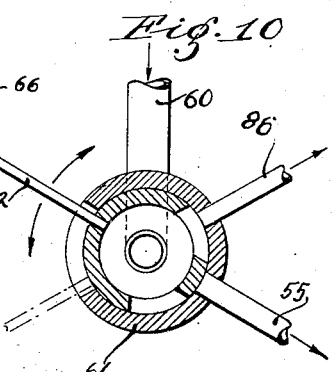
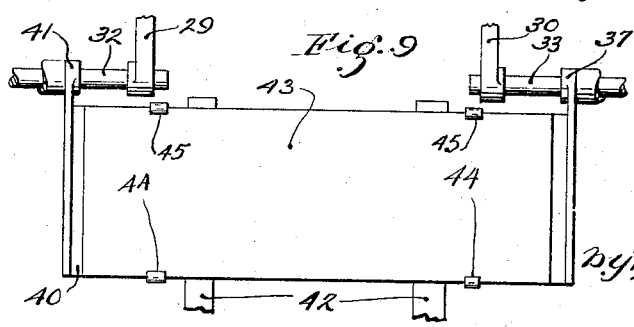
Inventors
Abiram A. Oeffner
Vincent Trotta
By Roberts, Cushman & Woodbury
Attys.

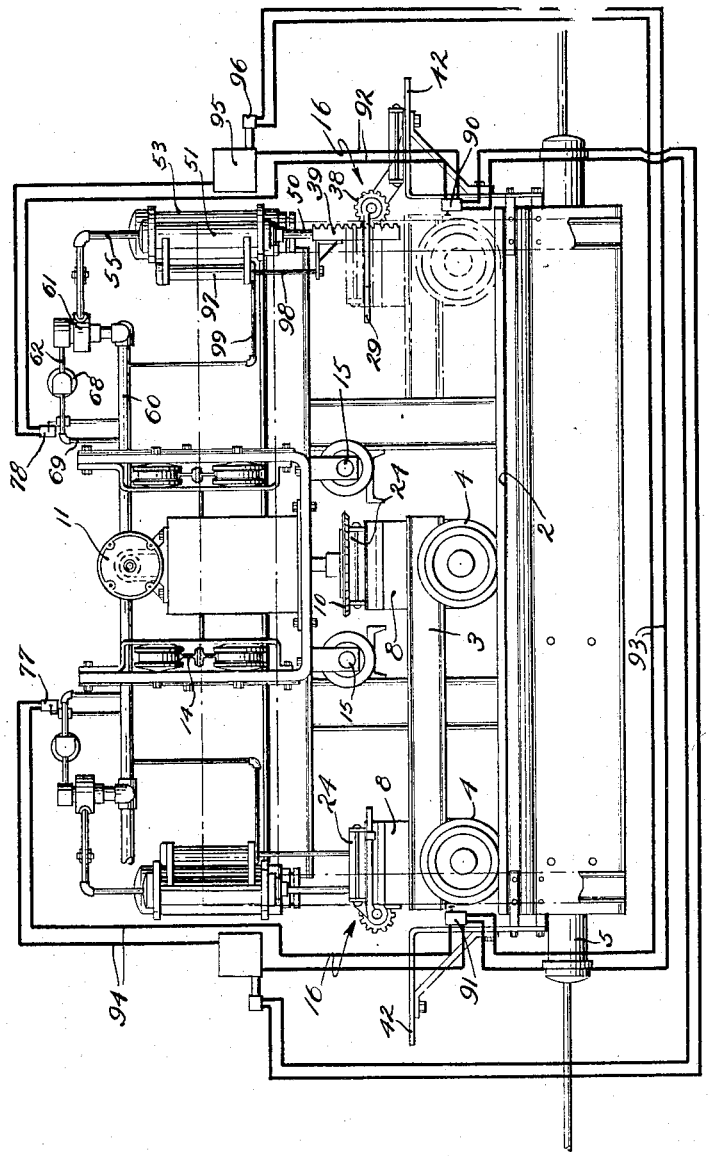

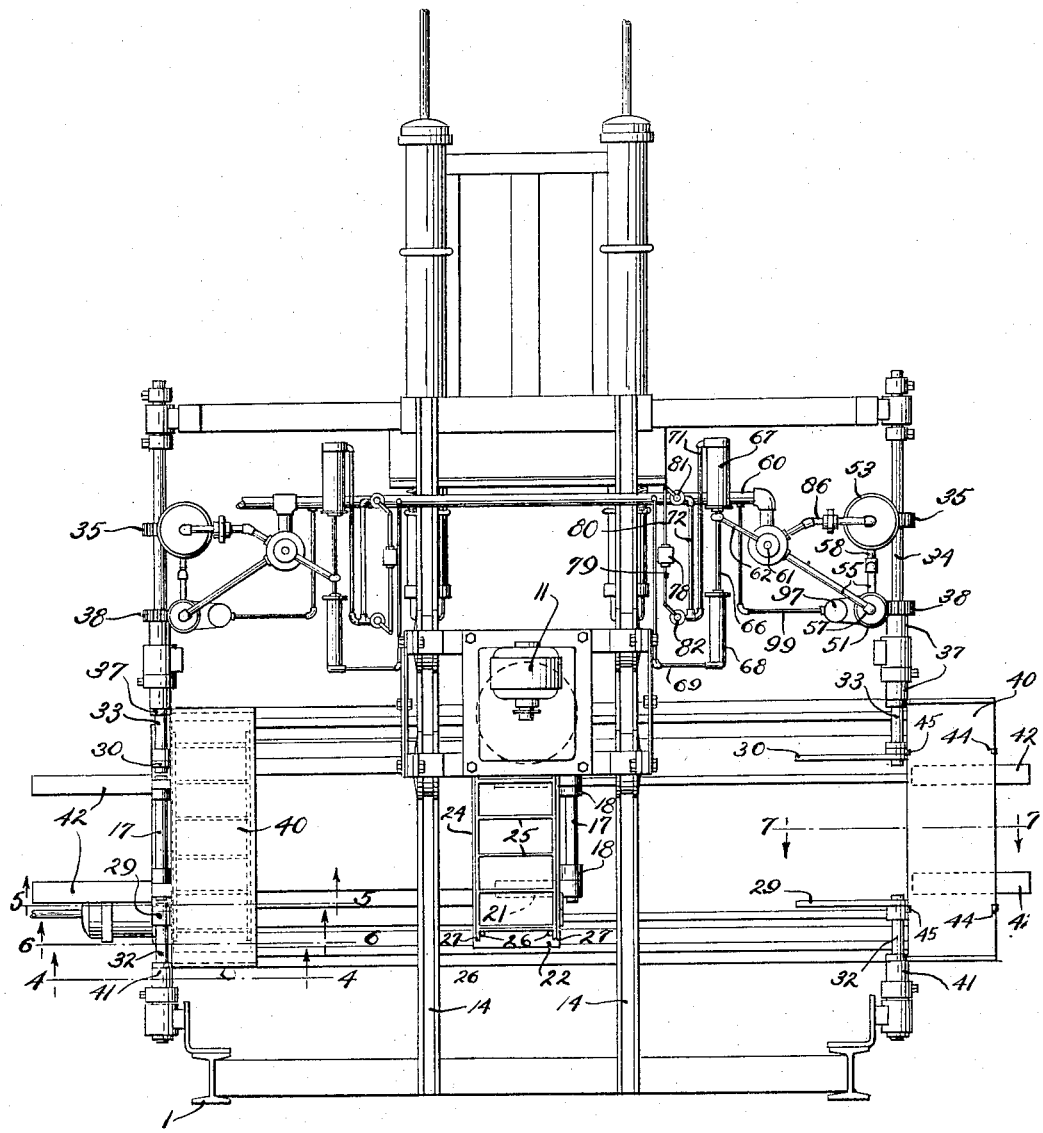

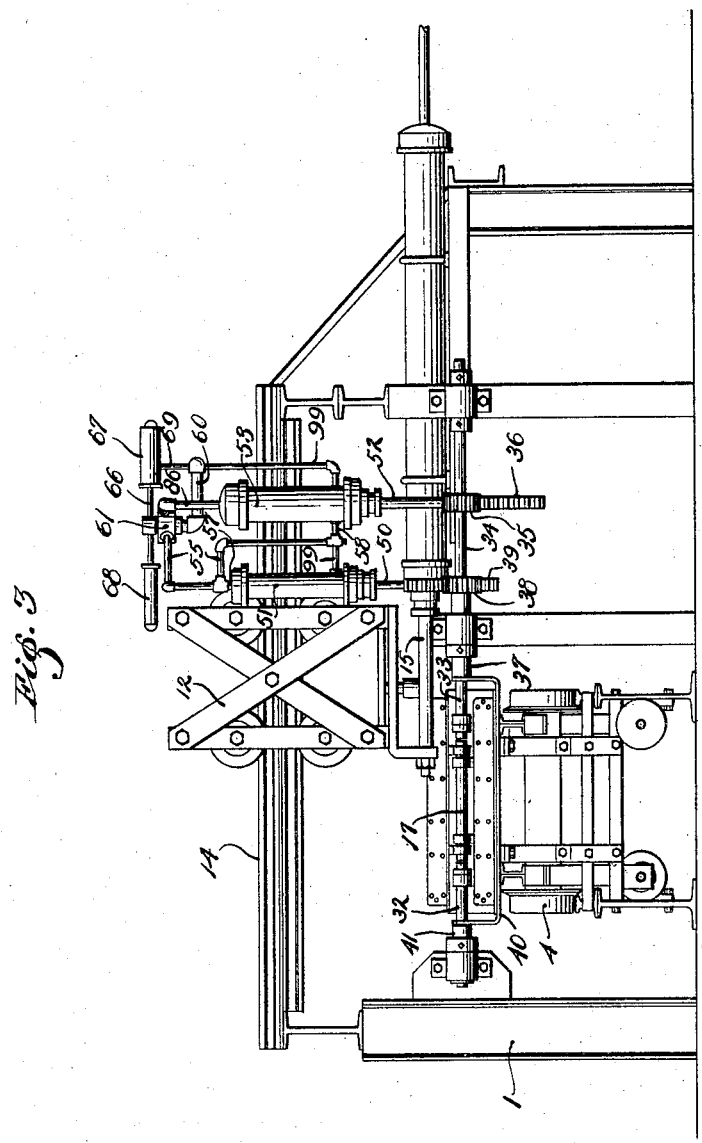

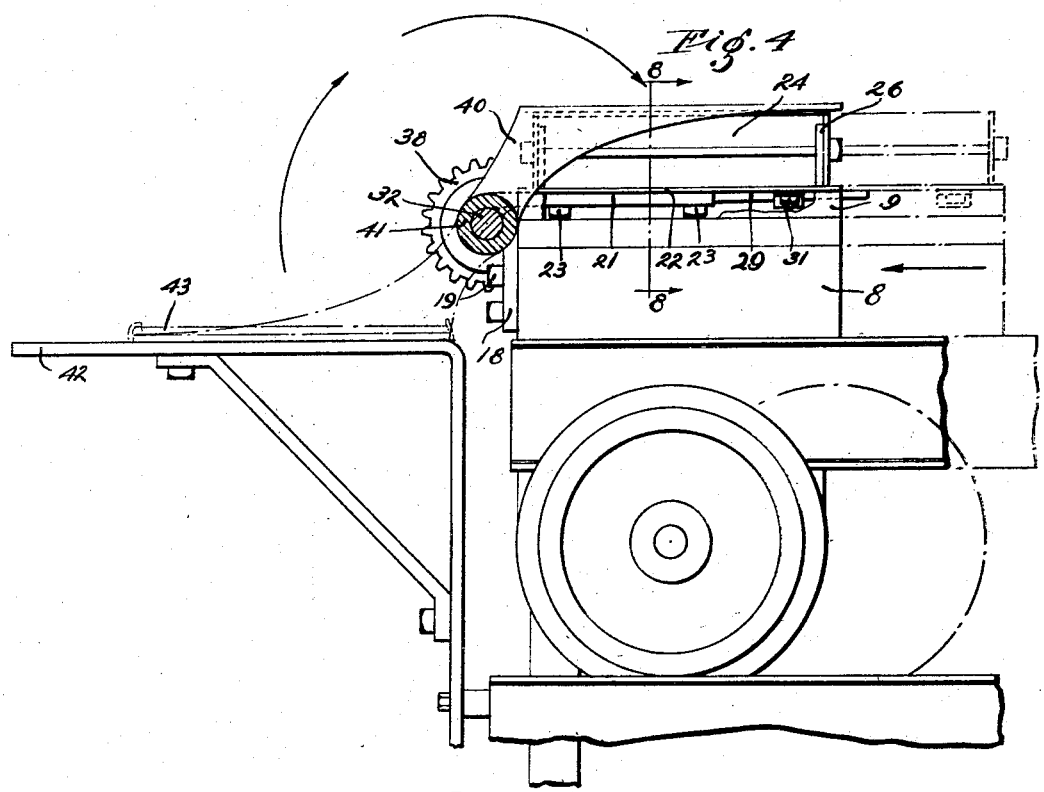
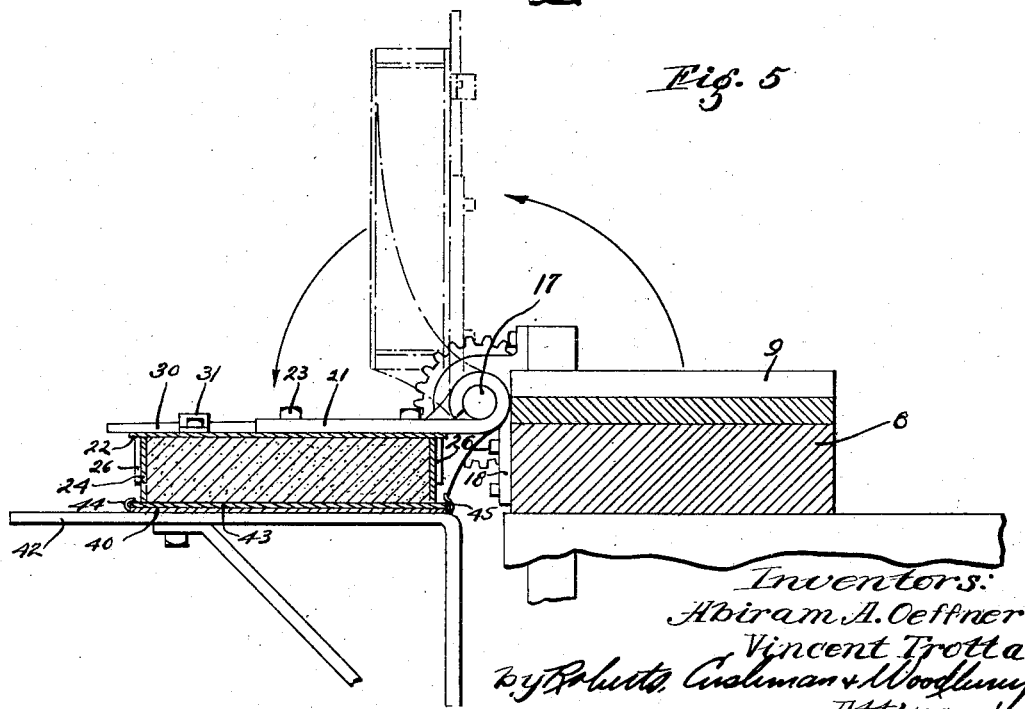

Patented Sept. 22, 1931

1,824,493

UNITED STATES PATENT OFFICE

ABIRAM A. OEFFNER AND VINCENT TROTTA, OF MOUNT UNION, PENNSYLVANIA, ASSIGNORS TO HARBISON-WALKER REFRACTORIES COMPANY, OF PITTSBURGH, PENNSYLVANIA, A CORPORATION OF PENNSYLVANIA

BRICK MOLDING MACHINE

Application filed April 8, 1929. Serial No. 353,403.

This invention pertains to molding machines and relates more particularly to mechanism useful in the molding of refractory bricks or other articles from granular material such as ground ganister. The present invention thus affords an improved machine for performing the process set forth in Patent No. 1,352,677 of Charles L. Norton in which the method of molding shapes of ground ganister or the like is fully explained. The present invention in some respects comprises an improvement upon the machines disclosed in Patent No. 1,524,877 of Charles L. Norton, wherein means is disclosed for mechanically performing the molding process explained in the earlier patent identified above.

The present invention is particularly designed to afford an improved means for permitting the rapid production of bricks or molded shapes of this character which require unusual care in their production, since they are much more friable or frangible than articles manufactured of the usual clays. This invention particularly affords means for receiving the ground ganister or the like from a suitable discharge point whence the material is projected in the form of a dense, unrestrained swarm of discrete particles into an open mold box in quantity to fill the latter to overflowing, the surplus material then being scraped or slicked off. The filled mold box is then traversed toward an unloading table, a pallet or cover plate is applied to the top of the mold box and the latter with the pallet is inverted and the molded shape is left upon the pallet carrier for conveyance to the drying oven, the mold box being removed for reuse.

The principal object of the present invention is to provide novel and improved mechanism for practicing the above described process and particularly to provide means for imparting the necessary movement to the molded shape without any substantial jar, shock or vibration thereto at any stage in the process, thus avoiding damage to the unusually friable material, to provide readily controllable means designed automatically to place the pallet plate upon the filled mold box, and to invert the same so that the molded articles may be left upon the pallet for drying and the mold box removed therefrom for immediate reuse, the various movements preferably being accomplished by pneumatic means and suitably cushioned so that the friable molded articles are not subjected to appreciable shock.

With the above objects in view, the present machine affords, in its preferred embodiment, a transversely moving car which carries mold supporting anvils at either end, which passes under discharge mechanism at the mid point of its path, and which at either end of its path delivers one or the other of the mold boxes supported thereon to the receiving and inverting mechanism, which more particularly forms the subject matter of the present invention. These operations are performed while a charge is being supplied to the mold box at the other end of the movable car and while the excess material is being slicked from that mold. Thus the mechanism may be so timed and controlled that while one mold box is receiving its charge, the other is being inverted or is ejecting its charge; accordingly two unloading tables and pallet carriers are provided, one at each side of the machine at equal distances from the discharge point and at opposite sides thereof.

In the accompanying drawings in which certain parts of the mechanism are broken away and other parts shown in section, Fig. 1 is a front elevational view of one embodiment of the invention with a dot and dash line showing of a second position of one end of the car;

Fig. 2 is a plan view of the machine shown in Fig. 1;

Fig. 3 is an end elevation of the same looking to the left of Figs. 1 and 2;

Fig. 4 is a section on line 4—4 of Fig. 2, showing the pallet plate as it is superimposed upon the mold and indicating in dot and dash lines its position on the unloading table;

Fig. 5 is a section on line 5—5 of Fig. 2, showing the position of the parts when the mold is inverted resting upon the pallet plate and the unloading table, the dotted lines of this figure indicating the position of the mold, pallet plate and related parts as they are being inverted;

Fig. 6 is a section on line 6—6 of Fig. 2 showing in broken and full lines respectively successive positions of the elements during the replacement of the mold box plate upon the car and the return movement of the car;

Fig. 7 is a section on line 7—7 of Fig. 2, showing the position of the parts after the removal of the deposited mold and before the car is returned for a successive delivery;

Fig. 8 is a section in line 8—8 of Fig. 4;

Fig. 9 is a fragmentary plan view showing the pallet and its supports, as shown in Fig. 7; and Fig. 10 is a diagrammatic view, illustrating the operation of an air control valve.

Referring to the accompanying drawings which illustrate one embodiment of the present invention, it is evident that the machine may be provided with any suitable framework 1 which comprises uprights, horizontal braces and the like of any desired form, the exact configuration and arrangement of which is a matter of design and mechanical skill and accordingly is not described in detail herein. This machine is provided with a transverse track 2 upon which a car 3 mounted upon flanged wheels 4 is adapted to be moved in response to the pneumatic actuation of plungers in cylinders 5. The intermediate portion of this track is disposed beneath suitable discharged mechanism of the character shown for example in Patent No. 1,524,877, which does not directly form a part of the present invention. At each end of the car 3 are suitable anvils or mold supports 8 having upstanding side flanges 9 which are adapted alternately to lie beneath the discharge mechanism. A slicker 10 of the type which is conventional in these machines is driven by a motor 11 supported upon a suitable trolley 12 that moves upon an elevated track 14. Hydraulically controlled plungers 15 are adapted to effect the movement of this slicker over the mold after the charge has been dropped into the latter.

At either side of the frame 1 are mold inverting mechanisms, designated in general by numerals 16 (Fig. 1) which are adapted to receive a filled mold, to impose a pallet upon the same, and to invert the mold and pallet upon suitable supports. For this purpose, as shown more in detail in Figs. 4 to 7, a horizontal shaft 17 is mounted as by hinge straps 18 carried by bolts 19 on the outer side of each anvil 8, to form a pintle for hinge elements 21 to which a rigid mold supporting plate 22 is secured by rivets 23 or the like.

A mold box 24 may be placed upon this plate, the mold being open at the top and the bottom and preferably having transverse partitions 25 dividing it into a series of similar compartments of a shape and size corresponding to that of the bricks or other molded shapes to be formed. The mold box is preferably held against sliding movement over the face of the plate 22 by the provision of upstanding pins or lugs 26 which fit behind projecting sides 27 of the box (Figs. 2 and 8), or by other suitable retaining members which will permit the box to be vertically removed from the plate and substituted by another box, as hereinafter described.

As the mold receiving and inverting mechanisms 16 at each side of the machine are identical, a description of one set of operative parts will suffice. Corresponding arms 29 and 30 are arranged at one side of the machine normally to project into the paths of U-clamps or straps 31 fixed upon the bottom of the corresponding mold supporting plate 22. The respective arms are fixed upon rotatable shaft elements 32 and 33 which are aligned with each other, the opposed ends of said shafts being suitably spaced to permit the shaft 17 to move into alignment therewith when the car arrives at one end of its path, the parts then occupying the position shown at the left of Fig. 2.

The shaft element 33 has a rearward continuation 34 carrying a gear 35 which engages an actuating rack 36 (Fig. 3) to effect rotation of the shaft and movement of the arm 30 through an arc of approximately 180 degrees. A sleeve or hollow shaft 37 is disposed about the shaft 33 and carries a second gear 38 engaging with a rack 39 which is adapted to effect rotation of shaft 37. Said shaft 37 is connected by a suitable U-shaped member 40, Figs. 3 and 4, to a cooperating sleeve 41 aligned therewith and mounted around bearing elements 32. The central flat portion of the member 40 constituting a swingable pallet support, and in normal position said support seats upon brackets 42 which are secured to the frame 1 and provide an unloading table for receiving the inverted covered mold.

A pallet 43 may be removably fastened upon the plate 40 by means of fixed lugs 44 and one or more spring lugs 45 or other suitable fastenings, so that the pallet may move as a unit with the plate 40 and hollow shafts 37 and 41 in response to movement of gear 38. The rack 39 is secured to the lower end of a plunger 50 which is adapted to be actuated by pneumatic pressure in a cylinder 51; while rack 36 is carried by a corresponding plunger 52 adapted to be moved by pneumatic pressure in a larger cylinder 53. By means of the pneumatic mechanism now to be described, the movement of the swingable supporting plate 40 with its pallet 43 from the position shown at the right of Fig. 2 to that indicated at the left of said figure, and the subsequent actuation of the arms 29 and 30 to reverse this movement and carry the covered mold box 24 with plate 40 to the unloading platform, are accomplished automatically.

A pipe 55 is adapted to provide compressed air for each of the cylinders 51 and 53, this pipe having a connection 57 with the upper end of the smaller cylinder 51 and a connection 58 with the lower end of the larger cylinder 53. Air from a main supply pipe 60 is admitted to the pipe 55 by means of a valve 61 which is controlled by an oscillating arm 62. The outer end of the latter is articulated to a plunger 66 which extends into opposed pneumatic cylinders 67 and 68, the latter having a smaller piston area and receiving a constant supply of air under pressure through a pipe 69 from the main air supply pipe 60. Cylinder 67 is adapted to receive air under pressure through a pipe 71 which is connected to the main air supply duct 60 by pipe 72 and control valves 81 and 82.

A magnet 78 is adapted to actuate plungers 79 and 80 in order to open valve 81 and close relief valve 82, thereby to supply the air to pipe 72 and thence through pipe 71 to cylinder 67. Since the latter is larger than cylinder 68 and since air at the same pressure is supplied to both cylinders when the valve 81 is open, the larger cylinder will effect the movement of the plunger 66 toward the smaller cylinder 68, thus opening valve 61 and permitting air to flow through pipe 55 to the rack actuating cylinders 51 and 53.

A spring switch 90 is disposed at the end of the path of the car at one side of the machine (at the right of Fig. 1), this switch being connected by suitable leads 92 with the magnet 78 so that upon contact of the car and switch, the circuit being properly conditioned and supplied with current, the magnet 78 will be energized to cause movement of plunger 66, opening of valve 61, and the supply of air to the cylinders 51 and 53. Since the smaller cylinder 51 is connected to gear 39 and thence to the pallet support 40 and since this cylinder has much less weight to lift than the cylinder 53, the opening of valve 61 will result first in the depression of plunger 50 and the consequent swinging of the plate 40 and its pallet 43, so that they are moved through an arc of substantially 180 degrees and swing inwardly to rest upon the filled mold 24 at the end of the car which has just engaged the spring switch 90.

When the plunger 50 has been forced to its lowest position, the air supplied through pipe 55 will become effective in lifting plunger 52 in the larger cylinder 53, thereby causing the rotation of shaft 33 and the movement of the arm 30, mold supporting plate 22, mold box 24, pallet 43 and pallet support 40 through an arc of substantially 180 degrees until the pallet support rests upon the bracket arms 42 projecting from the side of the machine. Thus the mold is deposited upon the pallet plate which rests upon the unloading table.

During this movement of the plunger 52, the plunger 50 is actuated by gear 39 through shaft 37, so that it is returned to its normal uppermost position against the cushioning effect of the air pressure in cylinder 51. When the plunger 50 reaches its uppermost position, it operates an adjacently located spring switch 95 (as by any suitable mutually contacting members carried by the plunger and switch respectively, which are not specifically illustrated in the drawings) to open the circuit supplying current to leads 92, so that the magnet 78 is no longer energized. Plungers 79 and 80 then operate to close valve 81 and open relief valve 82, and thereupon cylinder 68, which is constantly under air pressure becomes effective in moving the plunger 66 and the adjoining end of lever 62 toward the cylinder 67, moving the valve 61 and interrupting flow of air through pipe 55.

A pipe 86 connects valve 61 with the upper end of cylinder 53, air from pipe 60 being admitted to the same when the opening into pipe 55 is closed (Fig. 10), so that the pressure at the top of cylinder 53 depresses plunger 52 and rotates gear 35 and shaft 33. Hence the arm 30 and mold supporting plate 22 leave the detachable mold upon the pallet and return to their former position over the anvil 8. The car 3 is then moved to the other side of the machine by admittance of air to the operating cylinder 5 where it closes a spring switch 91 which controls a relay 96 through leads 93, that closes the switch 95, reconditioning the first circuit for closing when the switch 90 therein is again engaged by the end of the car at the next traverse. The closing of switch 91 also actuates a magnet 77 (corresponding to magnet 78) through its circuit 94, to cause the same operations at the left of the machine of Fig. 1.

A suitable cushioning cylinder 97 has a plunger 98 rigidly connected to the plunger 50, and contains air under constant pressure which is supplied to its lower end by a pipe 99, so that this cylinder is adapted to act as a shock absorber to soften the downward stroke of the plunger 50 in cylinder 51. Furthermore, the cylinder 97 is effective in holding the plunger 50 in upper position when the pipe 55 is closed by valve 61.

The operation of the machine is believed to be apparent from the foregoing description. The movable car 3 reciprocates back and forth on its tracks 2 to carry first one and then the other of its anvils 8 from charge-receiving position at the center of the track to mold-inverting position adjacent the mechanism 16 and unloading platform 42. The movement of the car is so timed that the mold on the centrally positioned anvil is filled and scraped by the slicker 10 while the other mold is being transferred with its cover pallet from its anvil to said platform, and such movement is preferably accomplished by the pneumatic cylinders 5 which may obviously be regulated in step with the pneumatic control of the inverting mechanism. In any event, the mold-inverting mechanism is automatically actuable when the mold and its anvil or support arrives at inverting position, as by operation of the spring switches 90 or 91 and the electrical, pneumatic and mechanical systems thereby controlled; and it will be observed that the operative mold-inverting arm 30 and its complemental arm 29, which are normally positioned in the path of the approaching mold support for sliding attachment thereto, not only invert the covered mold 24 and its hinged supporting plate 22 and deposit the mold box upon the unloading platform, but also return the plate 22 to normal position on top of the anvil, without interruption in the operation of the machine.

As noted above, the mold box is loosely supported upon the plate 22 by the corner pins 26, so that, as the plate is returned to the anvil (Fig. 6), the mold is released from said supports and remains upon the panel 43 which is mounted upon the panel support 40 which rests upon the bracket arms 42. The mold box may then be lifted from the shaped bricks for reuse, and the bricks may be transported to the drying oven upon the removable pallet 43. The removed mold box or a box from a convenient supply may be placed upon the empty plate 22 while the car is moving away to bring the anvil to charge-receiving position.

We claim:

1. In a machine of the class described, a mold, a carriage for moving the mold from charge-receiving position to mold-inverting position while maintaining the mold upright, means for covering the mold with a pallet while the mold is on the carriage, and operatively associated means for inverting the covered mold while retaining the pallet thereon.

2. In a machine of the class described, a mold, a carriage for moving the mold from charge-receiving position to mold-inverting position while maintaining the mold upright, a pallet for covering the mold, pivotally mounted means for inverting the covered mold, and means rotative about the same pivotal axis for retaining the pallet upon the mold during the inversion thereof.

3. In a machine of the class described, a mold, a carriage for moving the mold from charge-receiving position to mold-inverting position while maintaining the mold upright, a pallet for covering the mold, pivotally mounted means for inverting the covered mold, and means rotative about the same pivotal axis for retaining the pallet upon the mold during the inversion thereof, both of said means being pneumatically controlled, and the pneumatic control for the pallet retaining means being effective to retard the speed of the inverting means.

4. In a machine of the class described, a mold, a carriage for moving the mold from charge-receiving position to mold-inverting position while maintaining the mold upright, a pallet for covering the mold, automatically actuable means for imposing the pallet upon the mold when it arrives at the latter position, and means operative, after the imposition of the pallet, for inverting the covered mold while the pallet is retained thereon by the last-named means.

5. In a machine of the class described, a mold, a carriage for moving the mold from charge-receiving position to mold-inverting position while maintaining the mold upright, a pallet for covering the mold, automatically actuable means for imposing the pallet upon the mold when it arrives at the latter position, and pivotal means automatically operable, as a consequence of the operation of the pallet-imposing means, for inverting the covered mold, said pallet-imposing means being effective to retain the pallet upon the mold during the operation of inverting the mold and also to retard the speed of the inverting means.

6. In a machine of the class described, a mold, a carriage for moving the mold from charge-receiving position to mold-inverting position while maintaining the mold upright, a pallet for covering the mold, automatically actuable means for imposing the pallet upon the mold when it arrives at the latter position, and means operative after the imposition of the pallet for inverting the covered mold while the pallet is retained thereon by the last-named means, both of said means being pivotally mounted about the same axis, and actuator mechanism for both of said means arranged to operate them in association so that the inverting means is automatically actuated after the pallet is imposed upon the mold, the actuator mechanism for the pallet-imposing means being effective to hold said means in pallet retaining position during inversion of the mold and also to retard the speed of the inverting means.

7. In a machine of the class described, a mold, a carriage for moving the mold from charge-receiving position to mold-inverting position while maintaining the mold upright, a pallet for covering the mold, means for imposing the pallet upon the mold when it arrives at the latter position, and means operative after the imposition of the pallet, for inverting the covered mold while the pallet is retained thereon by the last-named means, and a hydraulic buffer associated with said pallet-imposing means to retard the speed of the inverting means.

8. In a machine of the class described, a mold, a carriage for moving the mold from charge-receiving position to mold-inverting position while maintaining the mold upright, a pallet for covering the mold, means for imposing the pallet upon the mold when it arrives at the latter position, and means operative after the imposition of the pallet for inverting the covered mold while the pallet is retained thereon by the last-named means, and pneumatic means for controlling the pallet-imposing means so that its speed of movement and the speed of operation of the mold-inverting means are retarded.

9. A machine of the class described comprising a movable carriage, an anvil at one end of the carriage, a mold-supporting member pivotally connected to the anvil for swinging movement over the end thereof, the anvil being traversed from charge-receiving to mold-inverting position upon movement of the carriage, a mold mounted on said member adapted to be supported in upright position during movement of the carriage, a pallet for covering the mold, an unloading table, a pivoted carrier for the pallet movable to transfer the pallet from a position above the unloading table to the top of the mold when the anvil is in mold-inverting position, means for moving the carriage to bring the pivotal connection for the mold-supporting member into alignment with the pivotal mounting of the pallet-carrier, means for swinging the pallet onto the mold, and means for subsequently inverting the mold, the pallet, and their respective supports onto the unloading table.

10. A machine of the class described comprising a movable carriage, an anvil at one end of the carriage, a mold-supporting member pivotally connected to the anvil for swinging movement over the end thereof, the anvil being traversed from charge-receiving to mold-inverting position upon movement of the carriage, a mold removably mounted on said member and adapted to be supported in upright position against horizontal displacement during movement of the carriage, a pallet for covering the mold, an unloading table, a pivoted carrier for the pallet movable to transfer the pallet from a position above the unloading table to the top of the mold when the anvil is in mold-inverting position, means for moving the carriage to bring the pivotal connection for the mold-supporting member into alignment with the pivotal mounting of the pallet-carrier, means for swinging the pallet onto the mold, and means for subsequently inverting the mold, the pallet, and their respective supports onto the unloading table, and means automatically operative after the inversion of the mold to reverse the operation of said last-named means and return the mold-supporting member to the top of the anvil.

11. A machine of the class described comprising a movable carriage, an anvil at one end of the carriage, a mold-supporting member connected to the anvil, the anvil being traversed from charge-receiving to mold-inverting position upon movement of the carriage, a mold mounted on said member adapted to be supported in upright position during movement of the carriage, a pallet for covering the mold, an unloading table, a pivoted carrier for the pallet movable to transfer the pallet from a position above the unloading table to the top of the mold when the anvil is in mold-inverting position, means for moving the carriage to associate the mold-supporting member with the pallet-carrier, means for swinging the pallet onto the mold, mold-inverting mechanism including an arm pivotally mounted about the same axis as the pallet-carrier and normally disposed in the path of the moving anvil to engage the mold-supporting member, and means for swinging said arm to invert the mold with its pallet and pallet-carrier upon the unloading table.

12. A machine of the class described comprising a movable carriage, an avil at one end of the carriage, a mold-supporting member connected to the anvil, the anvil being traversed from charge-receiving to mold-inverting position upon movement of the carriage, a mold removably mounted on said member and adapted to be supported in upright position against horizontal displacement during movement of the carriage, a pallet for covering the mold, an unloading table, a carrier for the pallet movable to transfer the pallet from a position above the unloading table to the top of the mold when the anvil is in mold-inverting position, means for moving the carriage to associate the mold-supporting member with the pallet-carrier, means for moving the pallet onto the mold, an arm disposed in the path of the anvil releasably to engage the mold-supporting member as the anvil arrives at mold-inverting position, means operative after the pallet has been placed upon the top of the mold for moving said arm to invert the mold with its pallet and pallet-carrier upon the unloading table, the pallet-moving means being effective during the inverting operation to retain the pallet upon the mold and to retard the speed of the inverting means, and means automatically operative after the inversion of the mold to return the mold-supporting member to the top of the anvil.

13. A machine of the class described comprising a movable carriage, an anvil at one end of the carriage, a mold-supporting member movably connected to the anvil, the anvil being traversed from charge-receiving to mold-inverting position upon movement of the carriage, a mold mounted on said member adapted to be supported in upright position during movement of the carriage, a pallet for covering the mold, an unloading table, carrier for the pallet movable to transfer the pallet from a position above the unloading table to the top of the mold when the anvil is in mold-inverting position, means for moving the carriage to associate the mold-supporting member with the pallet-carrier, pneumatic means automatically actuable upon the arrival of the anvil at mold-inverting position for moving the pallet onto the mold, and pnematic means associated with the last-named means and automatically operative after the pallet is placed upon the mold for inverting the mold and the pallet onto the unloading table, the inverting mechanism including an arm arranged to be engaged by the mold-supporting member when the latter arrives at mold-inverting position.

14. In a machine of the class described comprising a movable carriage, an anvil at one end of the carriage, a mold-supporting member movably connected to the anvil, an upright mold on said member, means for traversing the carriage to move the mold from charge-receiving to mold-inverting position, means for imposing a pallet on the mold when it arrives at mold-inverting position, inverting mechanism operative, after the imposition of the pallet, to move the mold-supporting member, mold, pallet, and pallet-imposing means from the anvil to an unloading table; pneumatic controlling means for operating the pallet-imposing means and inverting mechanism comprising a cylinder having a plunger adapted to operate the pallet-imposing means, a cylinder having a plunger adapted to operate the inverting mechanism, and means for concomitantly forcing air into both cylinders, the operated devices offering different resistance to movement whereby the plunger in one cylinder is first actuated to operate the pallet-imposing means, and the plunger in the second cylinder is thereafter automatically actuated, upon completion of the operation of the first, to operate the inverting mechanism, the pressure upon the plunger in the first cylinder being effective during the inverting operation to retard the speed of the inverting mechanism.

15. In a machine of the class described comprising a movable carriage, an anvil at one end of the carriage, a mold-supporting member movably connected to the anvil, an upright mold on said member, means for traversing the carriage to move the mold from charge-receiving to mold-inverting position, means for imposing a pallet on the mold when it arrives at mold-inverting position, inverting mechanism operative after the imposition of the pallet to move the mold-supporting member, mold, pallet and pallet-imposing means from the anvil to an unloading table, pneumatic controlling means for operating the pallet-imposing means and inverting mechanism comprising a cylinder having a plunger adapted to operate the pallet-imposing means, a cylinder having a plunger adapted to operate the inverting mechanism, and means for concomitantly forcing air into both cylinders the operated devices opposing different resistances to movement whereby the plunger in the first cylinder is first actuated to operate the pallet-imposing means and the plunger in the second cylinder is thereafter automatically actuated, upon completion of the last-named operation, to operate the inverting mechanism, the pressure upon the plunger in the first cylinder being effective, during the inverting operation, to retard the speed of the inverting mechanism, and means automatically actuable upon the completion of the inverting operation to force air into the second cylinder on the opposite side of the plunger, whereby to return the mold-supporting member to the anvil.

16. In a machine of the class described comprising a mold-supporting member, a mold on said member, means for moving the mold from a charge-receiving to a mold-inverting position, means for imposing a pallet on the mold mechanism operative, after the imposition of the pallet, to invert the mold and pallet, and pneumatic controlling means for operating the pallet-imposing means and inverting mechanism, comprising a cylinder having a plunger adapted to operate the pallet-imposing means, a second cylinder of greater diameter than the first cylinder having a plunger adapted to operate the mold-inverting mechanism, and a common conduit for concomitantly admitting air under pressure to the top of the first cylinder and to the bottom of the second cylinder whereby to exert pressure against the respective plungers in opposite directions, the movement of the plunger in the second cylinder being resisted by the greater resistance afforded by the inverting mechanism until the operation of the pallet-imposing means has been completed, whereupon the pressure in the second cylinder, by reason of greater diameter automatically actuates its plunger to overcome the retarding resistance of the pressure in the first cylinder and operate the inverting mechanism.

17. In a machine of the class described comprising a mold-supporting member, a mold on said member, means for moving the mold-supporting member with the mold from charge-receiving to a mold-inverting position, means for imposing a pallet on the mold, mechanism operative after the imposition of the pallet to invert the mold and pallet, and pneumatic controlling means for operating the pallet-imposing means and inverting mechanism, comprising a cylinder having a plunger adapted to operate the pallet-imposing means, a second cylinder of greater diameter than the first cylinder having a plunger adapted to operate the mold-inverting mechanism, and means for concomitantly admitting air under pressure to the top of the first cylinder and to the bottom of the second cylinder whereby to exert pressure against the respective plungers in opposite directions, the movement of the plunger in the second cylinder being resisted by the greater resistance afforded by the inverting mechanism until the operation of the pallet-imposing means has been completed, whereupon the pressure in the second cylinder, by reason of its greater diameter automatically actuates its plunger to overcome the retarding resistance of the pressure in the first cylinder and operate the inverting mechanism, and an auxiliary cylinder having a plunger under constant air pressure, said plunger being rigidly connected to the plunger in the first cylinder whereby the auxiliary cylinder serves as an hydraulic buffer to the operation of the pallet-imposing means.

18. In a machine of the class described comprising a mold-supporting member, a mold on said member, means moving the mold-supporting member with the mold from charge-receiving to a mold-inverting position, means for imposing a pallet on the mold, mechanism operative after the imposition of the pallet to invert the mold and pallet, and pneumatic controlling means for operating the pallet-imposing means and inverting mechanism, comprising an electrical circuit having a switch automatically actuable upon the arrival of the mold-supporting member at mold-inverting position, an air pressure control valve operable upon the actuation of said switch, a cylinder having a plunger adapted to operate the pallet-imposing means, a second cylinder having a plunger adapted to operate the mold-inverting mechanism, a conduit connecting said control valve with both of said cylinders, the opening of said valve admitting air under pressure concomitantly to the two cylinders whereby to exert pressure against the respective plungers, the movement of the second plunger being resisted by the greater resistance afforded by the inverting mechanism until the operation of the pallet imposing means has been completed, whereupon the pressure in the second cylinder automatically actuates its plunger to overcome the retarding resistance of the pressure in the first cylinder and to operate the inverting mechanism, a second conduit connecting said valve with the opposite end of the second cylinder, and a second switch in said circuit actuable upon the completion of the inverting operation automatically to operate said valve to cut-off the air supply to the first conduit and admit air to the second conduit, whereby the plunger in the second cylinder is actuated to return the mold-supporting member to the anvil.

19. In a machine of the class described having a movable carriage, an anvil at each end of the carriage, a mold-supporting member mounted on each anvil, and a mold removably supported in upright position on each of said members, pneumatic means for reciprocating the carriage alternately to carry the respective molds from charge-receiving to mold-inverting position, pallets for covering the respective molds, and pallet-imposing means adjacent to each mold-inverting position of the machine, mold-inverting mechanism adjacent to each of said positions, pneumatic means automatically actuable upon the arrival of one of the molds at inverting position to operate the pallet-imposing means and also to operate the mold-inverting mechanism upon the completion of the former operation, means automatically actuable upon the completion of the inverting operation to cause a reverse movement of the inverting mechanism to restore the mold-supporting member to its normal position on its anvil, and means automatically actuable upon movement of the carriage to the opposite mold-inverting position, to operate the pallet-imposing means and mold-inverting mechanism at the latter position.

20. In a machine of the class described having a movable carriage, an anvil at each end of the carriage, a mold-supporting member mounted on each anvil and a mold removably supported in upright position on each of said members, pneumatic means for reciprocating the carriage alternately to carry the respective molds from charge-receiving to mold-inverting position, pallets for covering the respective molds, and pallet-imposing means adjacent to each mold-inverting position of the machine, mold-inverting mechanism adjacent to each of said positions, pneumatic means arranged in two systems for alternately operating the respective sets of pallet-imposing and mold-inverting mechanisms at each side respectively of the machine, electrical circuits associated with the respective systems, a switch in each circuit arranged in the path of movement of the carriage so that one of said switches is operated upon the arrival of the carriage at the corresponding mold-inverting position thereby automatically to operate the corresponding pneumatic system, a second switch in each circuit adapted, upon the completion of the mold-inverting operation, to reverse the movement of the inverting mechanism and restore the mold-supporting member to its normal position on the anvil, and a relay in each circuit adapted, upon the operation of said switch by the carriage in approaching the opposite end of its path, to restore the first circuit to operative condition, each of said pneumatic systems including an air control valve, and magnetically operative means for operating said valve, said magnetic means being responsive to the actuation of each of said switches.

Signed by us at Mount Union, Penna., this second day of April, 1929.

ABIRAM A. OEFFNER.
VINCENT TROTTA.